United States Patent [19]

Allen

[11] Patent Number: 5,165,815
[45] Date of Patent: Nov. 24, 1992

[54] DEVICE FOR SEPARATING AND RESTRAINING BICYCLES

[76] Inventor: Richard A. Allen, 29 Devens St., Concord, Mass. 01742

[21] Appl. No.: 857,587

[22] Filed: Mar. 25, 1992

[51] Int. Cl.⁵ .............................................. F16D 1/00
[52] U.S. Cl. ...................................... 403/24; 403/391; 24/265 C; 224/42.03 B
[58] Field of Search .......................... 403/391, 399, 24; 24/265 C, 265 CD, 563; 224/42.03 B, 42.03 R

[56] References Cited

U.S. PATENT DOCUMENTS

| | | | |
|---|---|---|---|
| 2,735,377 | 2/1956 | Elsner | 24/265 CD |
| 3,669,491 | 6/1972 | Weslock | 403/391 X |

FOREIGN PATENT DOCUMENTS

| | | | |
|---|---|---|---|
| 205031 | 1/1955 | Australia | 403/391 |
| 1097224 | 1/1968 | United Kingdom | 403/391 |

*Primary Examiner*—Andrew V. Kundrat
*Attorney, Agent, or Firm*—Herbert L. Bello

[57] ABSTRACT

A device for securing and restraining a pair of adjacently mounted bicycles includes a body having first and second portions with at least one strap slidably connected thereto. The first portion is configured to engage the foot pedal of one bicycle while the second portion is configured to engage the frame of a second bicycle. At least one strap is provided for securing the device to at least one of the bicycles.

16 Claims, 2 Drawing Sheets

DEVICE FOR SEPARATING AND RESTRAINING BICYCLES

BACKGROUND OF THE INVENTION

1. Field of the Invention

The present invention relates to devices for carrying multiple bicycles and, more particularly, is directed towards devices for separating and restraining adjacent bicycles that are mounted on a carrier.

2. Description of the Prior Art

In recent years the popularity of bicycle riding for sport, recreation, and transportation has increased. Bicycle carriers of various configurations have been designed and developed to enable owners to transport and store one or more bicycles. The most common bicycle carriers are mountable on automobiles and are designed to carry several bicycles on a pair of carrying arms. The bicycles are positioned in side-by-side relationship on the carrying arms.

Unfortunately, bicycles often sustain damage as a result of coming in contact and rubbing against each other during transportation. In particular, scratching of the paint and physical damage to mechanical components can occur during transit when several bicycles are mounted on a carrier. Further, significant damage can occur if several bicycles become jammed and bang against each other during transportation over, for example, rough terrain.

A need has arisen for a device that can maintain bicycles mounted on a carrier in a spaced, substantially fixed, relationship relative to one another so as to prevent damage thereto.

SUMMARY OF THE INVENTION

It is an object of the present invention to provide a device for separating and restraining a pair of adjacently mounted bicycles.

It is a another object of the present invention to provide a device which can maintain a pair of adjacently mounted bicycles in spaced juxtaposition and substantially fixed relative to each other.

The device of the present invention is sized and shaped to be positioned between a first bicycle and a second bicycle that are mounted side-by-side on a common carrier. In operation, the device secures the bicycles so that they remain separated and fixed against relative movement. The invention thus prevents unwanted and deleterious contact between the bicycles.

The device of the present invention is generally characterized by a body that is sized and shaped to be positioned between a pair of bicycles that are mounted side-by-side on a bicycle carrier and at least one strap for securing the body to at least one of the bicycles. The body is an integral member having first and second portions. In the preferred embodiment of the invention, the first portion is configured to engage a foot pedal of one bicycle and the second portion is configured to engage a segment of the frame of the other or second bicycle. The first portion of the device includes a pair of extending flanges that preferably are substantially parallel to each other so as to form a substantially U-shaped opening. The U-shaped opening is sized to slip over and engage the foot pedal of one of the bicycles. An end of the second portion includes a U-shaped engaging means that is sized and shaped to make surface-to-surface contact with a frame segment of the other bicycle. This engaging means can have a semicircular or polygonal cross-section as necessary for the given style of bicycle.

In one embodiment of the invention, a pair of first and second strap elements are connected to the body and positioned so as to be substantially perpendicular to one another. More particularly, the first strap element is designed to circumferentially engage the first portion of the device and, when tightened, to press the flanges against the foot pedal of the bicycle inserted therebetween. The second strap element is positioned substantially perpendicular to the first strap element and is configured to circumferentially engage both the first and second portions of the device, the frame of the second bicycle, and the foot pedal of the first bicycle. The second strap element is also positioned such that it extends in a direction substantially perpendicular to the frame of the second bicycle. By overlapping the first and second strap elements, the bicycles are securely restrained apart and in fixed relationship relative to each other.

In another embodiment of the invention, a single strap element is connected to the body of the device. The strap element is positioned such that in operation it can circumferentially engage that end of the device which receives a foot pedal of a bicycle. Once the device is secured to the foot pedal, it is moved so that its second end presses against a frame portion of another bicycle.

Other general and specific objects of the invention will in part be obvious and will in part appear hereinafter.

The invention accordingly comprises the steps and apparatus embodying features of construction, combinations of elements and arrangements of parts adapted to effect such steps, as exemplified in the following detailed disclosure, the scope of which will be indicated in the accompanying claims.

BRIEF DESCRIPTION OF THE DRAWINGS

A fuller understanding of the nature and objects of the present invention will become apparent upon consideration of the following detailed description taken in connection with the accompanying drawings, wherein.

DETAILED DESCRIPTION OF THE PREFERRED EMBODIMENTS

Figure 1:
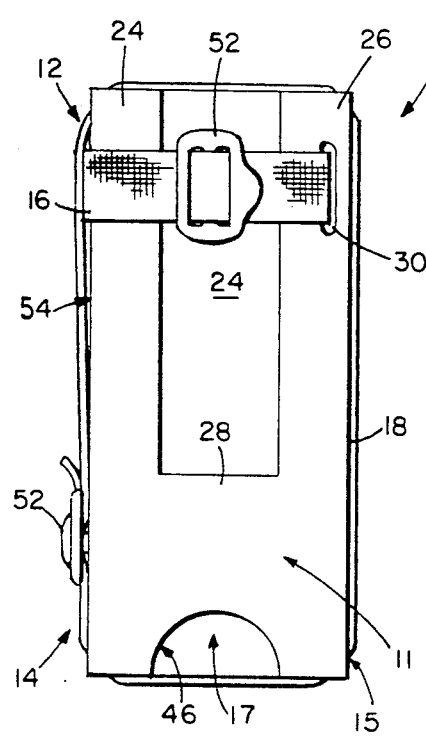
FIG. 1 is a side view of a first separating and restraining device embodying the invention.
Figure 2:
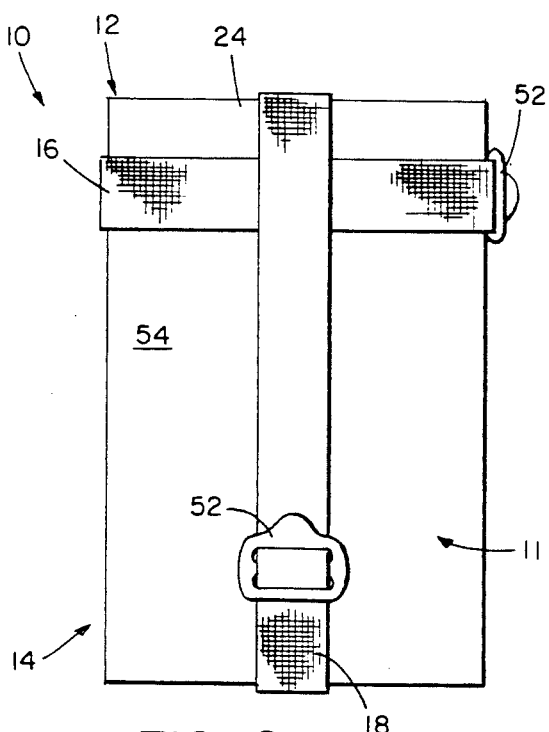
FIG. 2 is a top view of the separating and restraining device of FIG. 1.
Figure 3:
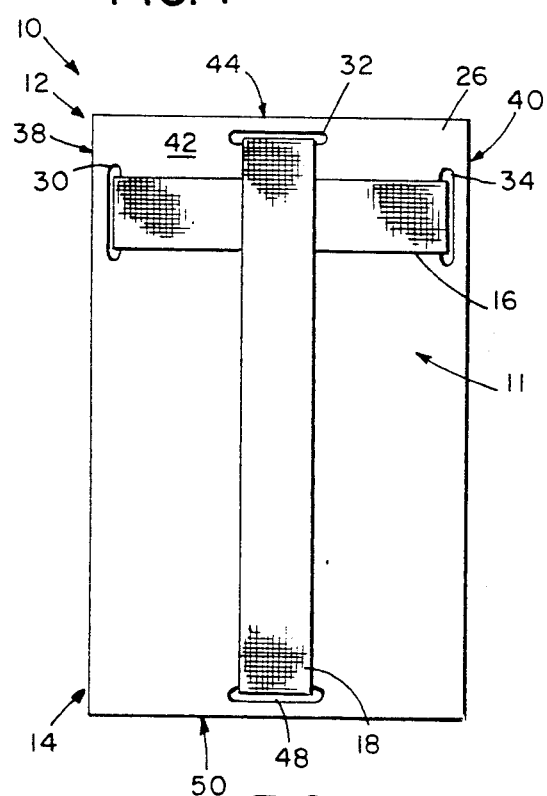
FIG. 3 is a bottom view of the separating and restraining device of FIG. 1.
Figure 4:
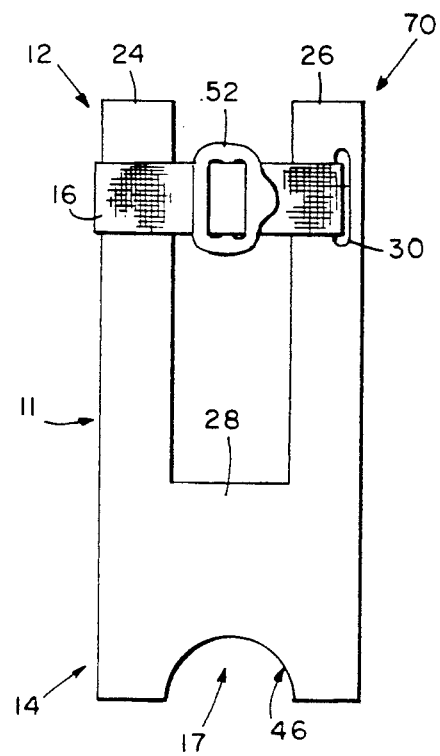
FIG. 4 is a view of a second separating and restraining device embodying the invention.
Figure 5:
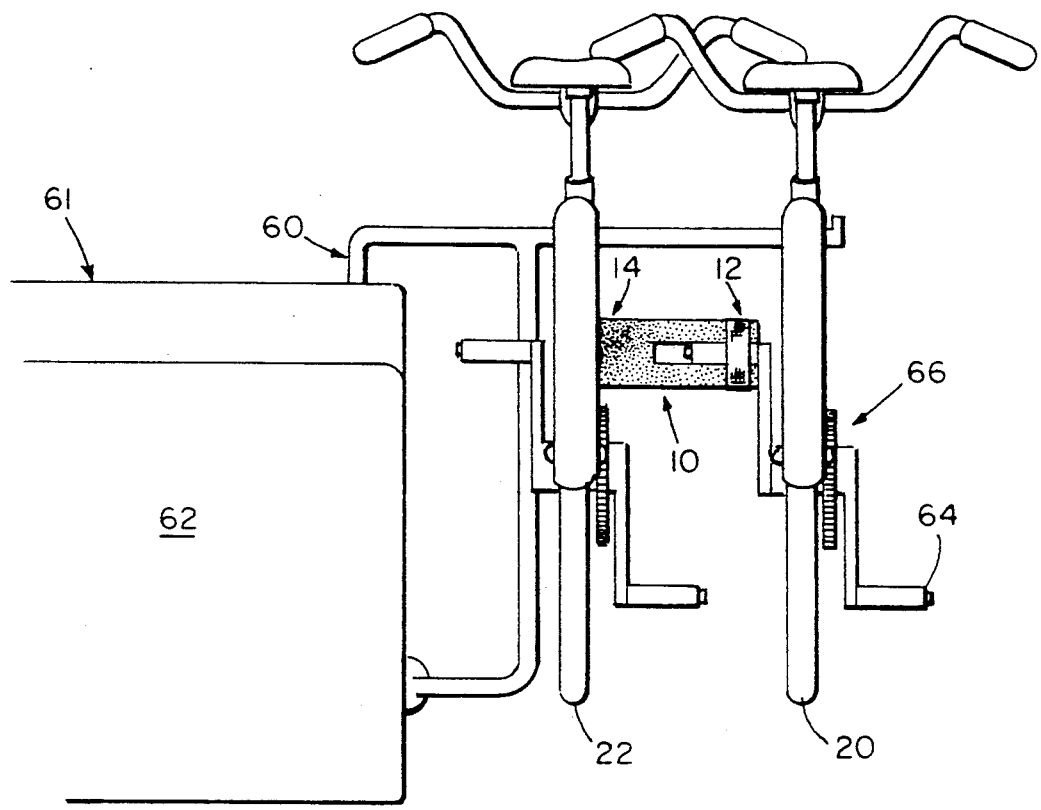
FIG. 5 i view of the device of FIG. 1 shown separating and restraining two bicycles.

Referring to FIGS. 1 through 5, wherein like reference characters refer to like parts, there is illustrated a separating and restraining device 10. The device 10 includes a body 11 having a first portion 12 and a second portion 14. A first strap element 16 is connected to the first portion 12. As shown in FIGS. 1 through 3, a second strap element 18 is connected to the second portion 14. As shown in FIG. 5, the device 10 separates and restrains a first bicycle 20 and a second bicycle 22 that are mounted on a carrier 60, for example a bicycle carrier that is configured to be mounted on a motor vehicle 61 (FIG. 5), to prevent the bicycles from contacting each other. The device 10 is composed on a non-abrasive flexible material such as foam or rubber.

As shown in FIGS. 1 through 5, the first portion 12 includes a pair of flanges 24 and 26 that are integral with a base 28. The flanges 24 and 26, and the base 28, cooperate to form a substantially U-shaped opening 29. The opening 29 is sized and shaped to engage the opposing flat surfaces of a typical bicycle foot pedal 64. The device 10 is composed of a material that is sufficiently resilient so that flanges 24 and 26 can clamp onto the bicycle foot pedal 64. In the preferred embodiment of the invention, the flange 26 includes a series of apertures 30, 32, and 34. The apertures 30, 32, and 34 are oriented diagonally relative to the flange 26. In particular, the apertures 30 and 34 extend from outside surfaces 38 and 40 to the face 42. Aperture 32 extends from the forward edge surface 44 to the face 42. All of the apertures 30, 32, and 34 have a height and width sufficient to accept the strap elements 16 and 18 described in detail below.

The second portion 14 includes an end 15 which is modified to form a substantially U-shaped engaging means 17. The engaging means 17 is configured to make surface-to-surface contact with a segment of the frame of the second bicycle 22. Accordingly, in the preferred embodiment an inner surface 46 of the engaging means 17 has a semicircular or polygonal cross-section as necessary for the given style of bicycle. In the illustrated embodiment, engaging means 17 is semi-circular. The end 15 preferably includes an aperture 48 that is oriented diagonally relative to the end 15. In particular, the aperture 48 extends from rear edge surface 50 to face 42. Aperture 48 also has a height and width sufficient to accept the strap element 18 described in detail below As shown in FIGS. 1 through 3, first and second strap elements 16 and 18 secure the device 10 to the bicycles 20 and 22. Each of the strap elements 16 and 18 is provided with a buckle 52 for securing together the first bicycle 20, device 10, and second bicycle 22. The strap elements 16 and 18 are positioned so that in operation they overlap each other. More particularly, as shown in FIGS. 2 and 3, the strap elements 16 and 18 are oriented in substantially perpendicular relationship to each other when the device 10 is in use. Overlapping of the first and second strap elements 16 and 18 increases the overall structural integrity of the device 10. The strap elements 16 and 18 are preferably composed of a natural or synthetic material, for example, nylon, and are approximately twelve (12) and eighteen (18) inches in length.

FIG. 4 depicts an alternative embodiment of the invention, a device 70, which is similar in construction and material to the device 10. Corresponding elements of devices 10 and 70 are designated by like reference characters. The device 70 is secured to a bicycle using only the first strap element 16. Instead of using a second strap element to secure the device 70 to a second bicycle, the bicycles are simply pressed against each other before being secured in position. Of course, care is taken to insure that the second portion 14 of the device 70 bears against a frame segment of the second bicycle.

The first strap element 16 is designed to circumferentially engage the first portion 12 of the device 10 or 70 as well as the foot pedal 64 of the first bicycle 20. To accomplish this the first strap element 16 is threaded through apertures 30 and 34 of the first portion 12. More particularly, the strap element 16 enters the aperture 30 through the outer surface 38 and exits out onto face 42. The strap element 16 then enters the aperture 34 through the face 42 and exits at the outer surface 40. The ends of the strap element 16 are then laid over the top surface 54 of the flange 24 and tightened using the buckle 52.

The second strap element 18, when used, is designed to circumferentially engage both the first portion 12 and the end 15 of the second portion 14, a segment of the frame of the second bicycle 22, and the foot pedal 64 of the first bicycle 20. The second strap element 18 is threaded through aperture 32 of the first portion 12 and aperture 48 of the second portion 14. More particularly, the second strap element 18 enters the aperture 48 through the rear edge surface 50 and exits onto the face 42. The second strap element 18 then enters aperture 32 through the face 42 and exits out onto the forward edge surface 44. The ends of the strap element 18 are then laid over the top surface 54 of the flange 24 and second portion 14. The second strap element 18 is tightened using the buckle 52.

As shown in FIG. 5, the device 10 can be used in conjunction with the carrier 60 that is mounted on the rear of, for example, a truck 62 of vehicle 61. With specific regard to the operation of the embodiment of the invention shown in FIGS. 1 through 3, the user first releases the buckles 52 so that the ends of the strap elements 16 and 18 are disconnected. Next, the first portion 12 is slipped onto a foot pedal 64 of a pedal assembly 66 of the first bicycle 20 until the end of the foot pedal 64 abuts the base 28 of the first portion 12. The ends of the first strap element 16 are then laid over the top of the flange 24 and tightened together using the buckle 52.

The first bicycle 20 is then placed next to the second bicycle 22. The pedal assembly 66 of bicycle 20 is rotated until the second portion 14 is in position to matingly engage a segment of the frame of the second bicycle 22. Once the second portion 14 is in mating engagement with the frame of the bicycle 22, the ends of the second strap element 18 are brought together such that a portion of the second strap element 18 surrounds the frame of the second bicycle 22. To complete assembly, the second strap element 18 is then tightened around the device 10 and frame of the second bicycle 22 using the buckle 52. The first and second bicycles 20 and 22 can then be secured to the carrier 60 as desired.

Those skilled-in-the-art will appreciate that a procedure similar to that stated above for use in conjunction with the embodiment of the invention depicted in FIGS. 1 through 3 can be used with the embodiment of the device 70 shown in FIG. 4. The only strap secured is strap 16 which is tightened about the first portion 12 of the body 11 and a foot pedal 64 of the first bicycle 20. Once the device 70 is attached to the bicycle 20, the bicycle 20 is mounted on the carrier 60 such that it is juxtaposed to the second bicycle 22. The pedal assembly 66 of the first bicycle 20 is then rotated until the end 15 of the second portion 14 matingly engage a portion of the frame of the second bicycle 22. The first and second bicycles 20 and 22 can then be secured to the carrier 60 as desired.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

What is claimed is:

1. A device for restraining and securing a first bicycle to a second bicycle, said device comprising:
    a body sized and shaped to be positioned between the first bicycle and the second bicycle and maintain the bicycles spaced apart, said body having a first portion and a second portion, said first portion configured to engage the first bicycle and said second portion configured to engage the second bicycle, said first portion being integral with said second portion;
    a first strap means for securing said first portion of said device to the first bicycle, said first strap means being connected to said first portion of said device; and
    a second strap means for securing said second portion of said device to the second bicycle, said second strap means being connected to said second portion of said device;
    a portion of said body being disposed between the bicycles, said second portion being in contact with the second bicycle, when said device is secured to the first and second bicycles by said first and second strap means.

2. The device of claim 1 wherein said first portion includes a pair of extending flanges that form a substantially U-shaped opening in said first portion.

3. The device of claim 2 wherein said flanges extend in substantially parallel planes.

4. The device of claim 3 wherein said flanges of said first portion are sized to engage opposite faces of a foot pedal of the first bicycle when the foot pedal is inserted into said opening and said first strap is tightened to secure said device.

5. The device of claim 1 wherein said end of said second portion includes an engaging means that is sized and shaped to make surface to surface contact with a portion of a frame component of the second bicycle that is adjacent to the first bicycle when said device is secured thereto.

6. The device of claim 1 wherein said first and second strap means are in substantially perpendicular relation to one another.

7. The device of claim 1 wherein said first strap means is configured to circumferentially engage said first portion of said device and the foot pedal of the first bicycle when said device is secured to the first bicycle.

8. The device of claim 1 wherein said second strap means is configured to circumferentially engage said first and second portions of said device, a frame component of the second bicycle, and the foot pedal of the first bicycle when said device is secured to the first and second bicycles.

9. A device for restraining and securing a first bicycle to a second bicycle, said device comprising:
    a body sized and shaped to be positioned between the first bicycle and the second bicycle and maintain the bicycles spaced apart, said body having a first portion integral with a second portion, said first portion having a substantially U-shaped first engaging means designed to engage the first bicycle and said second portion having an end with a substantially U-shaped second engaging means designed to engage the second bicycle;
    a first strap means connected to said first portion of said device for securing said first portion of said device to the first bicycle, said first strap means having an adjustable operative length; and
    a second strap means connected to said second portion for securing said device to the second bicycle, said second strap means having an adjustable operative length and extending in a first plane which is substantially perpendicular to a second plane containing a frame component of the second bicycle to which said device is secured to.

10. The device of claim 9 wherein said first strap means and said second strap means are in substantially perpendicular relation to each other.

11. The device of claim 9 wherein said first strap means is connected to said first portion such that said first strap circumferentially engages said first portion of said device and clamps said device to a foot pedal of the first bicycle inserted into said first engaging means when said first strap means is tightened.

12. The device of claim 9 wherein said second strap means is configured to circumferentially engage said first and second portions of said device, said frame component of the second bicycle that is in contact with said second engaging means, and a foot pedal of the first bicycle inserted into said first engaging means.

13. A device for restraining and securing a first bicycle to a second bicycle, said device comprising:
    a body sized and shaped to be positioned between the first bicycle and the second bicycle and maintain the bicycles spaced apart, one end of said body configured to engage a foot pedal of one of the bicycles, an opposite end said body being configured to engage the other bicycle; and,
    at least one strap means for securing said body to at least one of the bicycles.

14. The device of claim 13 wherein said strap means is connected adjacent to one end of said body, said strap being positioned such that it circumferentially engages one end of said body and secures said device to the foot pedal of one of said bicycles.

15. The device of claim 13 wherein one end is formed with a substantially U-shaped channel that is sized and shaped to receive a foot pedal of one of the bicycles.

16. The device of claim 15 wherein said body is composed of a material which is sufficiently resilient to permit said end to be clamped to the foot pedal inserted into said substantially U-shaped channel of said body when said strap means is tightened about the end of said body.

* * * * *